US010326340B2

(12) United States Patent
Iso et al.

(10) Patent No.: US 10,326,340 B2
(45) Date of Patent: Jun. 18, 2019

(54) DRIVING APPARATUS

(71) Applicant: Mitsuba Corporation, Gunma (JP)

(72) Inventors: Yukiyoshi Iso, Gunma (JP); Naoki Kojima, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 108 days.

(21) Appl. No.: 15/521,937

(22) PCT Filed: Oct. 26, 2015

(86) PCT No.: PCT/JP2015/080100
§ 371 (c)(1),
(2) Date: Apr. 26, 2017

(87) PCT Pub. No.: WO2016/068074
PCT Pub. Date: May 6, 2016

(65) Prior Publication Data
US 2017/0317564 A1 Nov. 2, 2017

(30) Foreign Application Priority Data

Oct. 27, 2014 (JP) .................................. 2014-217927

(51) Int. Cl.
*H02K 11/38* (2016.01)
*H02K 11/33* (2016.01)
(Continued)

(52) U.S. Cl.
CPC ........... *H02K 11/38* (2016.01); *H02K 7/1166* (2013.01); *H02K 11/33* (2016.01); *H02K 5/225* (2013.01); *H02K 2203/03* (2013.01)

(58) Field of Classification Search
CPC ...... H02K 11/33; H02K 11/38; H02K 7/1166; H02K 2203/03; H02K 5/225
(Continued)

(56) References Cited

U.S. PATENT DOCUMENTS

2006/0043803 A1 3/2006 Yagi
2007/0163541 A1* 7/2007 Schweinfurth ....... F02D 11/107
123/396
(Continued)

FOREIGN PATENT DOCUMENTS

EP  2179909 A2  4/2010
JP  H05-15097 A  1/1993
(Continued)

OTHER PUBLICATIONS

Supplementary European Search Report for Serial No. EP 15 85 4993 dated Apr. 20, 2018.
(Continued)

*Primary Examiner* — Naishadh N Desai
(74) *Attorney, Agent, or Firm* — McCormick, Paulding & Huber LLP (57) ABSTRACT

A driving apparatus having an electric motor configured to rotate a rotating shaft (27) by a supplied current, the driving apparatus comprising: a control board (49) which is positioned relative to the electric motor, and on which electronic components for controlling the electric motor is mounted; a plurality of first terminals (58, 59, 60) which are mounted on the control board (49), the first terminals (58, 59, 60) carrying a current; a plurality of second terminals (44, 45, 46) connected to the respective first terminals (58, 59, 60), the second terminals (44, 45, 46) carrying a current, the second terminals (44, 45, 46) being disposed outside the rotating shaft (27) in a radial direction of the rotating shaft (27) and arranged along a circumferential direction of the rotating shaft (27).

5 Claims, 8 Drawing Sheets (51) Int. Cl.
*H02K 7/116* (2006.01)
*H02K 5/22* (2006.01)

(58) Field of Classification Search
USPC .................................. 310/71, 89, 83, 98, 99
See application file for complete search history.

(56) References Cited

U.S. PATENT DOCUMENTS

2007/0205038 A1* 9/2007 Tominaga ............ B62D 5/0406
 180/444
2010/0101889 A1* 4/2010 Yamaguchi .......... B62D 5/0406
 180/444

FOREIGN PATENT DOCUMENTS

| JP | 2005263181 A | 9/2005 |
| JP | 2006-211869 A | 8/2006 |
| JP | 2008-252974 A | 10/2008 |
| JP | 2009225572 A | 10/2009 |
| JP | 2010200575 A | 9/2010 |
| JP | 2011-234453 A | 11/2011 |
| JP | 2012-161111 A | 8/2012 |
| JP | 5452332 B2 | 3/2014 |

OTHER PUBLICATIONS

International Search Report for PCT Serial No. PCT/JP2015/080100 dated Dec. 10, 2015.
European Communication for Serial No. 15 854 993.1 dated Dec. 17, 2018.

* cited by examiner

DRIVING APPARATUS

CROSS-REFERENCE TO RELATED APPLICATIONS

This application is a National Stage application of International Patent Application No. PCT/JP2015/080100, filed on Oct. 26, 2015, which claims priority to Japanese Patent Application Number 2014-217927, filed on Oct. 27, 2014, each of which is hereby incorporated by reference in its entirety.

TECHNICAL FIELD

The present invention relates to a driving apparatus having a terminal through which a current is supplied to an electric motor.

BACKGROUND ART

In a driving apparatus conventionally-known and disclosed in Japanese Patent Application Laid-Open Publication No. 2011-234453, a current is supplied to an electric motor through a terminal. The driving apparatus described in Japanese Patent Application Laid-Open Publication No. 2011-234453 includes: a motor case; a gear case fastened to the motor case with fastening screws; and a gear cover covering the gear case. An electric motor is housed in the motor case, and has a rotating shaft fitted with a worm. A worm gear is housed in the gear case, and engaged with the worm. A control board is disposed between the gear case and the gear cover.

An electric circuit is provided on the control board, and electronic components for controlling the electric motor are arranged on the electric circuit. The gear cover has a connector which is connected to a socket for a cord from an external power supply. A connector terminal disposed in the connector is connected to the electric circuit. The gear case has a terminal holder, and a terminal held by the terminal holder is connected to a coil of the electric motor. In the gear case, the terminal holder is disposed outside the rotating shaft.

In an assembling process of the driving apparatus described in Japanese Patent Application Laid-Open Publication No. 2011-234453, a control board is disposed between the gear case and the gear cover, and the gear cover is fixed to the gear case. By fixing the gear cover to the gear case, the connector terminal is fixed to the electric circuit on the control board, and the electric circuit is connected to the connector terminal through a terminal provided to the gear cover. Additionally, a driving apparatus having a terminal carrying a current is disclosed also in Japanese Patent Application Laid-Open Publication No. H05-15097 and Japanese Patent Application Laid-Open Publication No. 2008-252974.

SUMMARY

However, since the terminal holder described in Japanese Patent Application Laid-Open Publication No. 2011-234453 is arranged along a tangential direction of a circle of the rotating shaft, the riving apparatus encounters a problem to have a size increased in a radial direction of the rotating shaft.

An object of the present invention is to provide a driving apparatus improved so as not to be increased in size in a radial direction of the rotating shaft.

A driving apparatus according to one embodiment has an electric motor configured to rotate a rotating shaft by a supplied current, the driving apparatus comprising: a control board which is positioned relative to the electric motor, and on which electronic components for controlling the electric motor is mounted; a casing in which the electric motor is housed; a cover fitted to the casing, the cover supporting the control board; a worm formed on an outer periphery of the rotating shaft; a worm wheel which is housed in the casing, the worm wheel having a worm gear which is engaged with the worm; a plurality of first terminals mounted on the control board, the first terminals carrying a current; a plurality of second terminals which are connected to the respective first terminals, the second terminals carrying a current, the second terminals being disposed outside the rotating shaft in a radial direction of the rotating shaft, and arranged along a circumferential direction of the rotating shaft; and a terminal holder positioned to the casing, the terminal holder supporting the second terminals.

The driving apparatus according to another embodiment comprises: an opening with which the casing is formed; and a projecting portion with which the terminal holder is formed, the projecting portion being disposed in the opening with the terminal holder positioned to the casing, wherein the second terminals is supported by the projecting portion.

In the driving apparatus according to another embodiment, in a plan view perpendicular to an axis line of a rotation center of the worm wheel, an area occupied by the projecting portion and an area occupied by the worm wheel overlap each other.

In the driving apparatus according to another embodiment, the casing has a load receiving portion which receives a force applied to the second terminals, with the first terminals and the second terminals connected to each other.

According to the driving apparatus of one embodiment, it is possible to prevent the driving apparatus from being increased in size in a radial direction of a rotating shaft.

DETAILED DESCRIPTION

Figure 1:
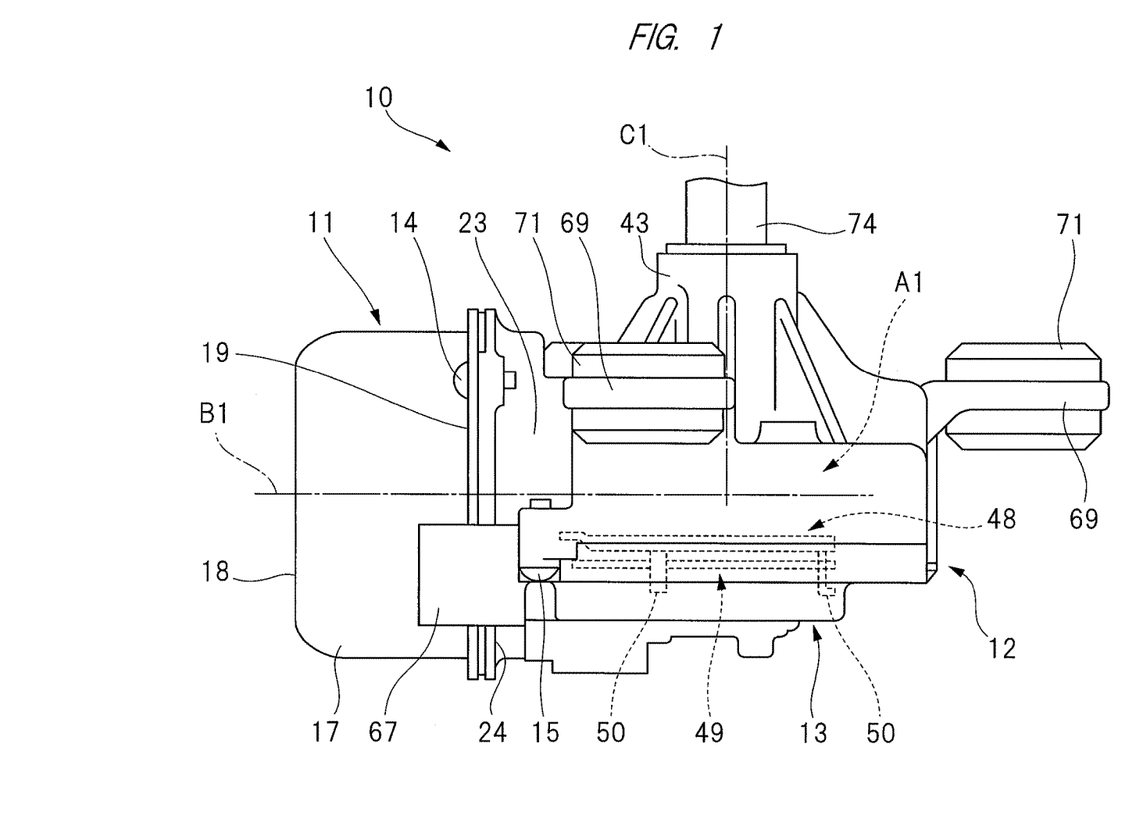
FIG. 1 is a front view showing an assembled driving apparatus according to one embodiment.

Hereinafter, one embodiment of a driving apparatus will be described in detail with reference to FIGS. 1 to 8. A driving apparatus 10 shown in FIG. 1 is in its completely assembled state. The driving apparatus 10 includes a motor case 11, a gear case 12, and a cover 13. The motor case 11 is fixed to the gear case 12, using a screw 14. The cover 13 is fixed to the gear case 12, using screws 15. A housing chamber A1 is formed between the gear case 12 and the cover 13.

The driving apparatus 10 includes also an electric motor 16 and a speed-reducing mechanism 73. The electric motor 16 is disposed in such a way as to extend from an interior of the motor case 11 into the gear case 12. The speed-reducing mechanism 73 is disposed in the gear case 12.

The motor case 11 includes: a cylindrical portion 17; a wall 18 closing a first end of the cylindrical portion 17 along an axis B1; and a flange 19 formed on a second end of the cylindrical portion 17 along the axis B1. The motor case 11 is made of metal material such as steel sheet, or may be integrally molded out of insulating material such as synthetic resin. An opening 34 is formed on the second end of the cylindrical portion 17, and the flange 19 overhangs outward in the radial direction of the cylindrical portion 17. The gear case 12 includes: a main body 22 having a shaft hole 20 and a recessed portion 21; a cylindrical connecting portion 23 continuous from the main body 22; and a flange 24 formed on an outer peripheral surface of the connecting portion 23. The flange 24 is fixed to the flange 19. The gear case 12 is integrally molded out of conductive material such as aluminum and iron.

The electric motor 16 has a stator 25 and a rotor 26. The stator 25 is attached to the motor case 11 and not rotatable with respect to the motor case 11. The stator 25 has a stator core and a plurality of coils wound around the stator core, and the coils include three coils, i.e., "U-phase coil", "V-phase coil", and "W-phase coil".

The rotor 26 has a rotating shaft 27 and a permanent magnet 28 fixed to an outer peripheral surface of the rotating shaft 27. The rotating shaft 27 extends from the interior of the motor case 11 through the connecting portion 23 and the shaft hole 20 into the recessed portion 21. The permanent magnet 28 is fitted to the rotating shaft 27, and disposed inside the motor case 11. Two bearings 29 and 30 are provided so as to rotatably support the rotating shaft 27. In this manner, the rotating shaft 27 can be rotated around the axis B1. The bearings 29 and 30 are supported by the gear case 12.

A worm 40 is fitted to the outer peripheral surface of one part of the rotating shaft 27, and disposed inside the recessed portion 21 of the gear case 12. A permanent magnet 47 is fitted to the outer peripheral surface of another part of rotating shaft 27, and disposed inside the recessed portion 21 of the gear case 12. The permanent magnet 47 is used as a sensor magnet, and has magnetic poles alternately arranged in a rotation direction of the rotating shaft 27.

Furthermore, a worm wheel 41 is disposed in the recessed portion 21, and a worm gear 42 formed on the outer peripheral surface of the worm wheel 41 is engaged with the worm 40. An output shaft 74 is provided, and rotated with the worm wheel 41. A cylindrical portion 43 is provided and continuous from the gear case 12, and the output shaft 74 is rotatably disposed in the cylindrical portion 43. The output shaft 74 extends from the housing chamber A1 to come out of the gear case 12. The worm 40 and the worm gear 42 collectively form the speed-reducing mechanism 73. An axis C1 is a rotation center of the output shaft 74, and does not intersect with the axis B1. In FIG. 1 which is a front view of the driving apparatus 10 seen in a direction parallel to the axis B1, the axis B1 and axis C1 are at right angles with each other.

Figure 3:
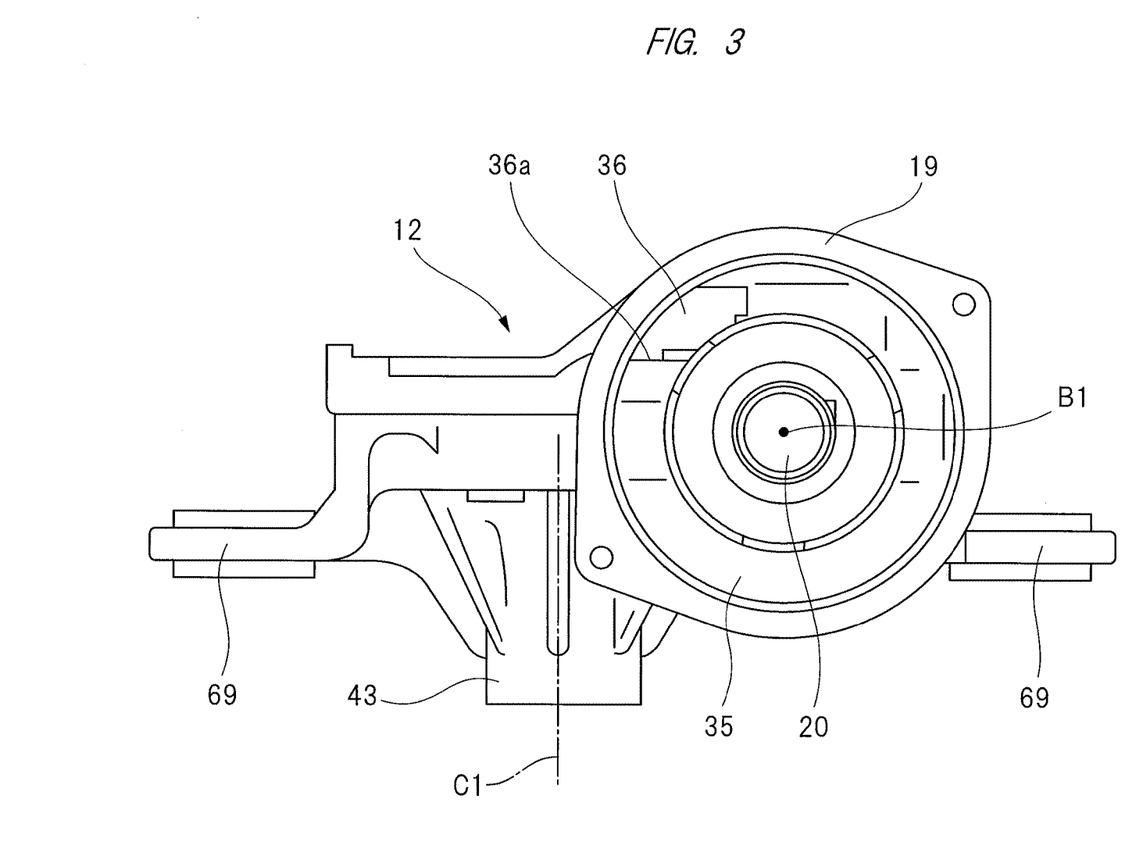
FIG. 3 is a side view of a gear cover of the driving apparatus shown in FIG. 1.
Figure 5:
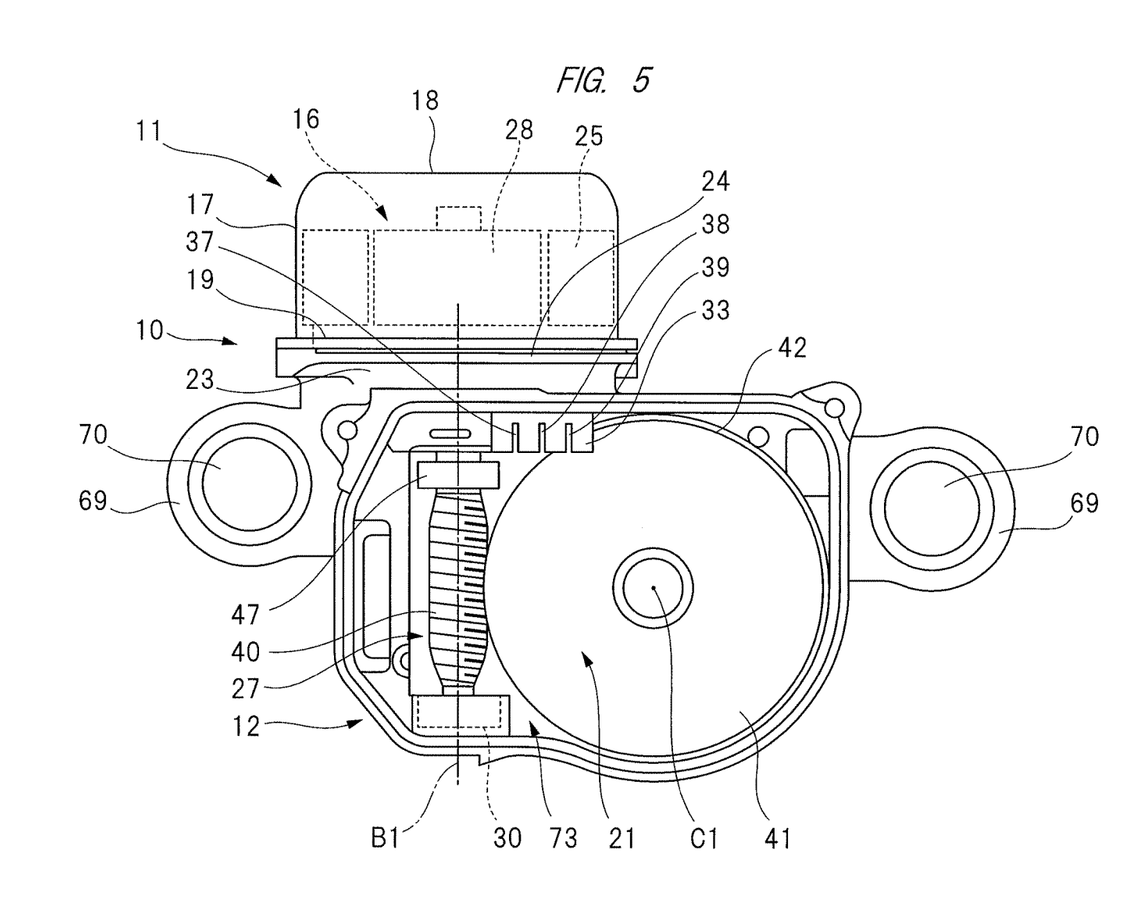
FIG. 5 is a bottom view showing an assembling process of the driving apparatus shown in FIG. 2.

On the other hand, the connecting portion 23 supports a terminal holder 31 integrally molded out of synthetic resin. The terminal holder 31 has a cylindrical portion 32, a projecting portion 33 formed on a part of the cylindrical portion 32 in its circumferential direction. The connecting portion 23 has an annular recessed portion 35 in which the cylindrical portion 32 is fitted. As shown in FIG. 3, the gear case 12 has a through-hole 36 connecting the recessed portion 35 of the connecting portion 23 to the recessed portion 21 of the gear case 12. The projecting portion 33 is formed in an area defined by a predetermined interior angle along the circumference around the axis B1. The projecting portion 33 is formed into, for example, an arcuate shape disposed in an area with an interior angle smaller than 90 degrees, and has a predetermined thickness in the radial direction of a circular plane around the axis B1. As shown in FIG. 5, in a plan view of the driving apparatus 10 seen on a plane perpendicular to the axis C1, a part of an area of placement of the projecting portion 33 overlaps a part of an area of placement of the worm wheel 41.

Figure 6:
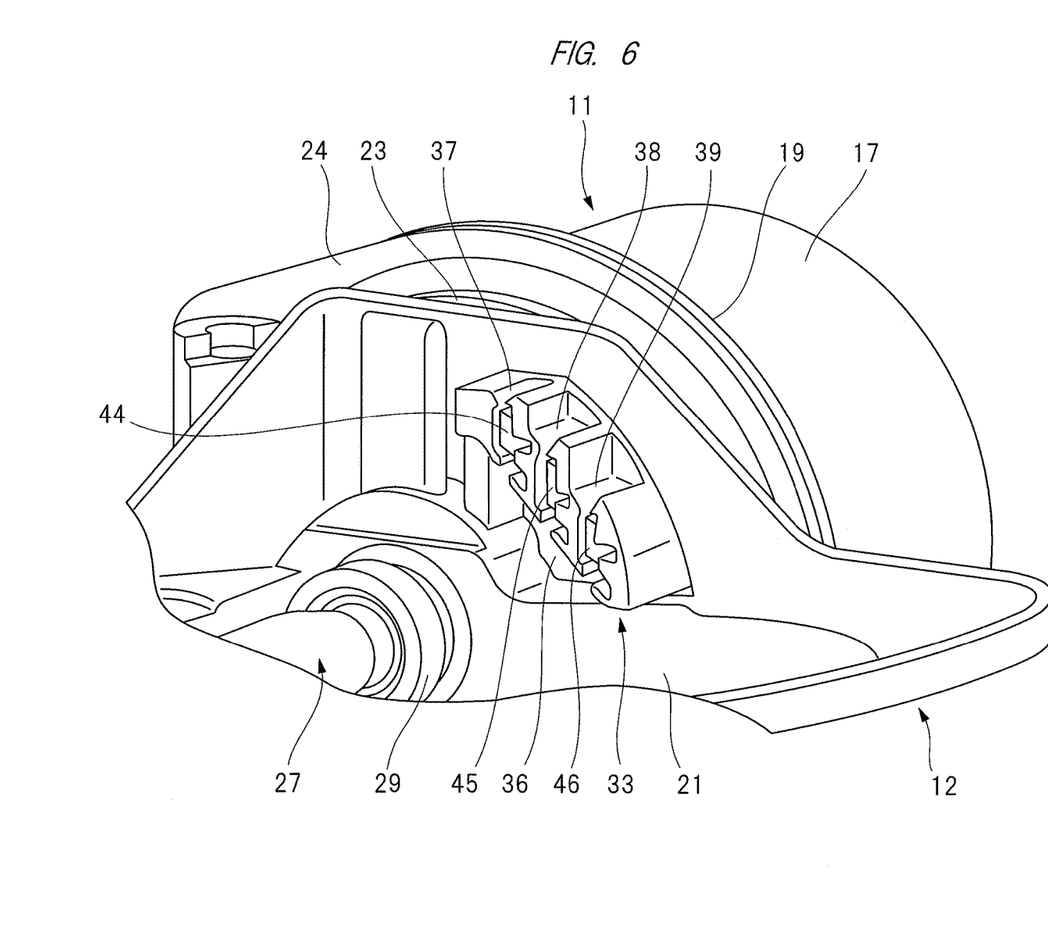
FIG. 6 is a perspective view partially showing the driving apparatus of FIG. 5.
Figure 7:
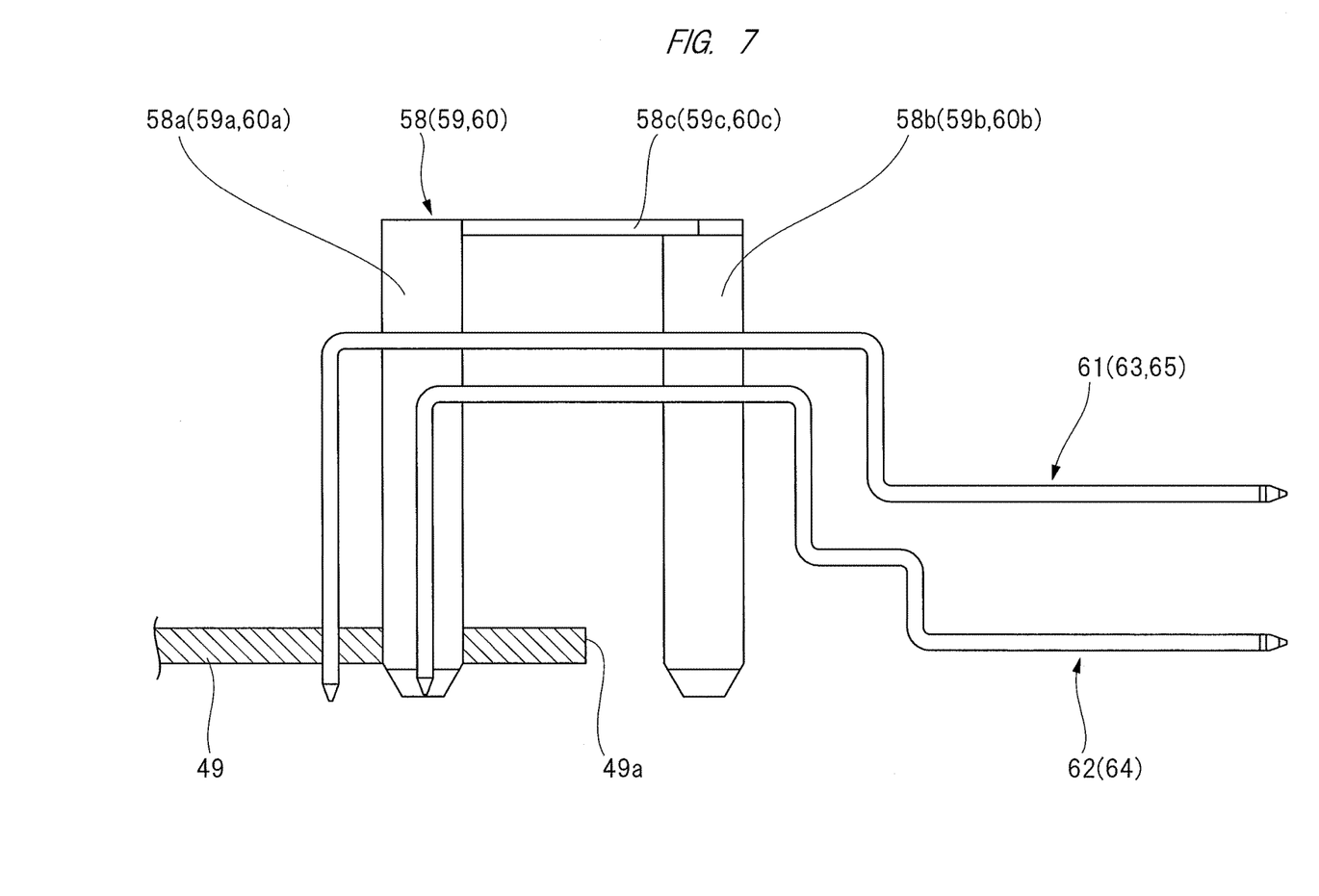
FIG. 7 is a partially sectional view showing a shape of a terminal mounted on a control board of FIG. 2.
Figure 8:
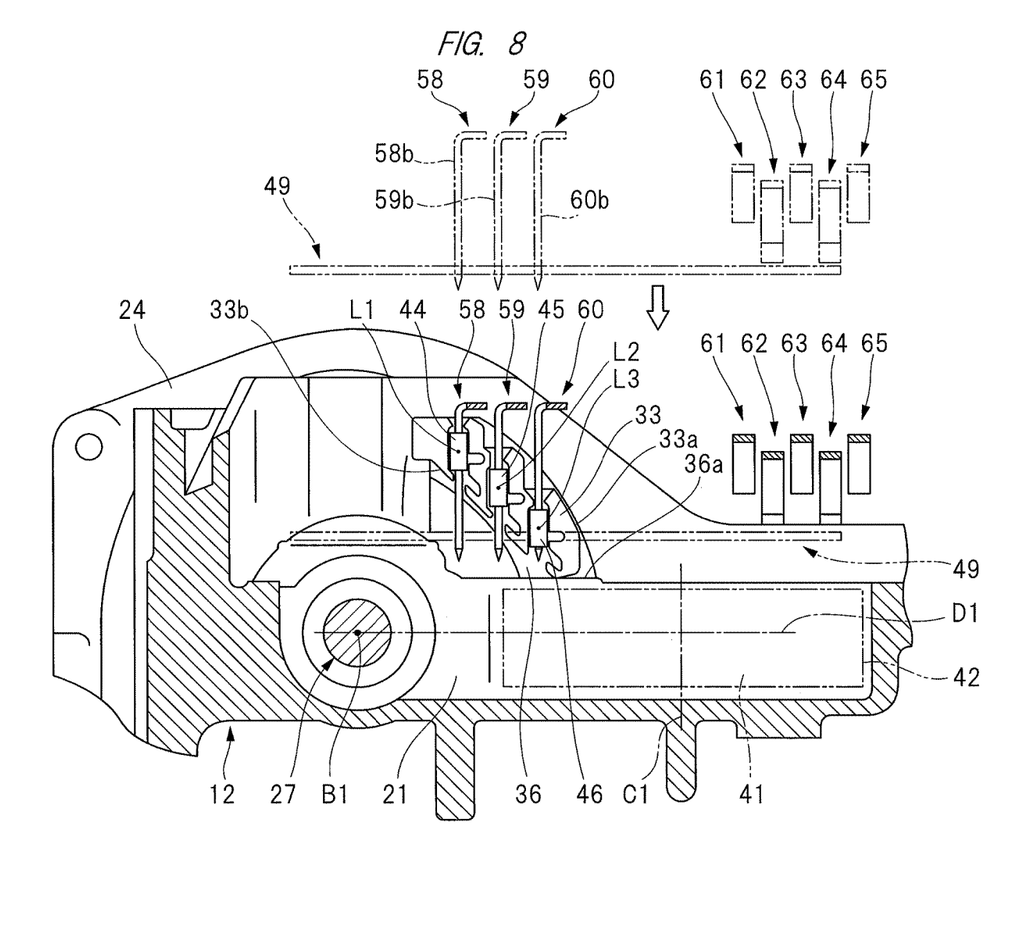
FIG. 8 is a sectional view showing an assembling process of the driving apparatus of FIG. 1.

When the terminal holder 31 is fitted in the recessed portion 35, the front end of the projecting portion 33 is placed in the recessed portion 21, as shown in FIG. 5. The part of projecting portion 33 which is placed in the recessed portion 21 has terminal holding slots 37, 38, and 39, as shown in FIGS. 6 and 8. The terminal holding slots 37, 38, and 39 are formed by cutting portions of the projecting portion 33 out in a direction along the axis C1. In other words, the terminal holding slots 37, 38, and 39 are cutouts penetrating the projecting portion 33 from its outer surface 33a to its inner surface 33b. The outer surface 33a is disposed outside the inner surface 33b in the radial direction of a circular plane around the axis B1. The terminal holding slot 37 has a center L1 in its length direction, the terminal holding slot 38 has a center L2 in its length direction, and the terminal holding slot 39 has a center L3 in its length direction. The length direction of the terminal holding slots 37, 38, and 39 is parallel with the axis C1.

On a plane perpendicular to the axis B1, the centers L1, L2, and L3 are disposed on substantially the same circumference around the axis B1. In other words, the distance from the axis B1 to the center L1, the distance from the axis B1 to the center L2, and the distance from the axis B1 to the center L3 are substantially the same.

Furthermore, a terminal 44 is provided and disposed in the terminal holding slot 37, a terminal 45 is provided and disposed in the terminal holding slot 38, and a terminal 46 is provided and disposed in the terminal holding slot 39. The terminals 44, 45, and 46 are respectively connected to the U-phase coil, V-phase coil, and W-phase coil, and this means that the terminals 44, 45, and 46 are arranged in the recessed portion 21 of the gear case 12. As shown in FIG. 8, the terminals 44, 45, and 46 have respective ends the same in shape as each other. The terminals 44, 45, and 46 are disposed at respective positions different from each other in the direction along the axis C1. Specifically, in the direction along the axis C1, the terminal 45 is disposed between the terminal 44 and the terminal 46. In this manner, in a plan view perpendicular to the axis B1, respective parts of terminals 44, 45, and 46 which are supported by the projecting portion 33 are put in stepped arrangement.

The projecting portion 33 and the terminals 44, 45, and 46 are arranged between the axis B1 and the axis C1 in a direction along a virtual line D1 making a right angle with the axis C1 and crossing the axis B1 on a plane perpendicular to the axis B1, as shown in FIG. 8, the virtual line D1.

A board cover 48 and a control board 49 are disposed in the housing chamber A1. The board cover 48 is integrally molded out of insulating material such as synthetic resin, and into a plate-like shape. The board cover 48 has a plurality of locking claws 50. The cover 13 has a plurality of locking portions 51 formed on an inner surface thereof. The locking claws 50 are respectively locked onto the locking portions 51. This fixes the board cover 48 to the cover 13.

Figure 2:
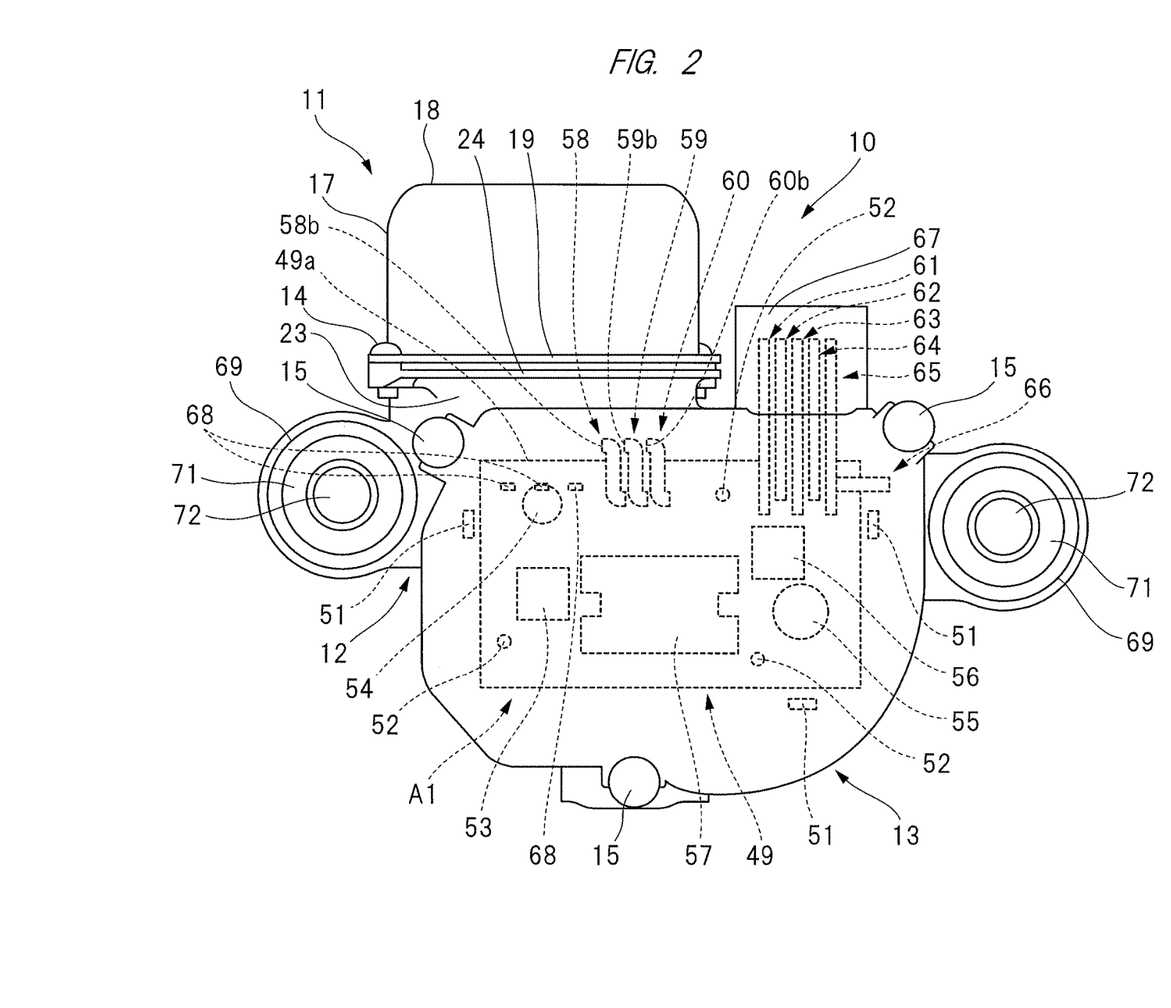
FIG. 2 is a bottom view of the driving apparatus shown in FIG. 1.

The control board 49 is disposed between the cover 13 and the board cover 48 in the direction along the axis C1. In FIG. 2 which is a bottom view of the driving apparatus 10, the control board 49 is substantially rectangular. The control board 49 is positioned and fixed to the cover 13, using a plurality of positioning screws 52. This sets the control board 49 parallel with the axis B1, as shown in FIG. 1.

The control board 49 is molded out of insulating material, and carries an electric circuit as well as various electric components. The electric components mounted on the control board 49 include a controller chip 53, capacitors 54 and 55, an inductor 56, an inverter chip 57 having a plurality of switching elements, terminals 58, 59, and 60, terminals 61 to 65, a ground terminal 66, and three magnetic sensors 68. The three magnetic sensors 68 are hall ICs, which detect the intensity and switching of a magnetic field generated by the permanent magnet 47 and output an electric signal.

The cover 13 has a connector 67. First ends of the terminals 61 to 65 are placed in the connector 67, and second ends of the same are connected to the electric circuit of the control board 49. A socket for a power cord connected to an external power supply is connected to the connector 67. The ground terminal 66 connects the electric circuit to the gear case 12. Next, the terminals 58, 59, and 60 will be described, referring to FIG. 7. The terminals 58, 59, and 60 are each integrally molded out of conductive material. The terminal 58 has leg portions 58a and 58b and a connecting portion 58c connecting the leg portion 58a to the leg portion 58b. The leg portion 58a has one end fixed to the control board 49, and the other end connected to the connecting portion 58c. The terminal 59 has leg portions 59a and 59b and a connecting portion 59c connecting the leg portion 59a to the leg portion 59b. The leg portion 59a has one end fixed to the control board 49, and the other end connected to the connecting portion 59c. The terminal 60 has leg portions 60a and 60b and a connecting portion 60c connecting the leg portion 60a to the leg portion 60b. The leg portion 60a has one end fixed to the control board 49, and the other end connected to the connecting portion 60c. The leg portions 58a, 58b, 59a, 59b, 60a, and 60b all extend in a thickness direction of the control board 49, that is, extend in a direction along the axis C1. In FIG. 2 which is a plan view of the driving apparatus 10, the leg portions 58b, 59b, and 60b are disposed outside the edge 49a of the control board 49.

The leg portion 58b of the terminal 58 is placed in the terminal holding slot 37 and is connected to the terminal 44 supported by the projecting portion 33. The leg portion 59b of the terminal 59 is placed in the terminal holding slot 38 and is connected to the terminal 45 supported by the projecting portion 33. The leg portion 60b of the terminal 60 is placed in the terminal holding slot 39 and is connected to the terminal 46 supported by the projecting portion 33.

The gear case 12 has a plurality of mounts 69 overhanging from its outer peripheral surface, and an annular bush 71 is fitted in a hole 70 of each mount 69. The bush 71 is integrally molded out of a rubber-like elastic member. Each bush 71 has a hole 72 in which a screw is screwed to mount the driving apparatus 10 to a vehicle body frame or a bracket.

The operation and control of the completely assembled driving apparatus 10 will then be described. Power is supplied from the external power supply to the electric circuit of the control board 49 through the terminals 61 to 65. As a result, the switching elements of the inverter chip 57 are switched on and off to cause current to flow through the three coils in order, which generates a rotating magnetic field, thus causing the rotating shaft to rotate. Power supplied from the external power supply is channeled through the terminals 58, 59, and 60 and the terminals 44, 45, and 46 to the three coils. The controller chip 53 detects the rotation position of the rotating shaft 27, based on a signal from the magnetic sensor 68, and controls timing of switching on and off the switching elements and the ratio of switching on the switching elements, thereby controls the number of revolutions, i.e., rotating speed of the rotating shaft.

In this manner, the electric motor 16 has a structure in which current flowing through the coils of the stator 25 causes the stator 25 to interact with the permanent magnet 28, thereby generating a rotating magnetic field. This structure does not include a brush and commutator. The electric motor 16 is, therefore, a brushless motor.

Figure 4:
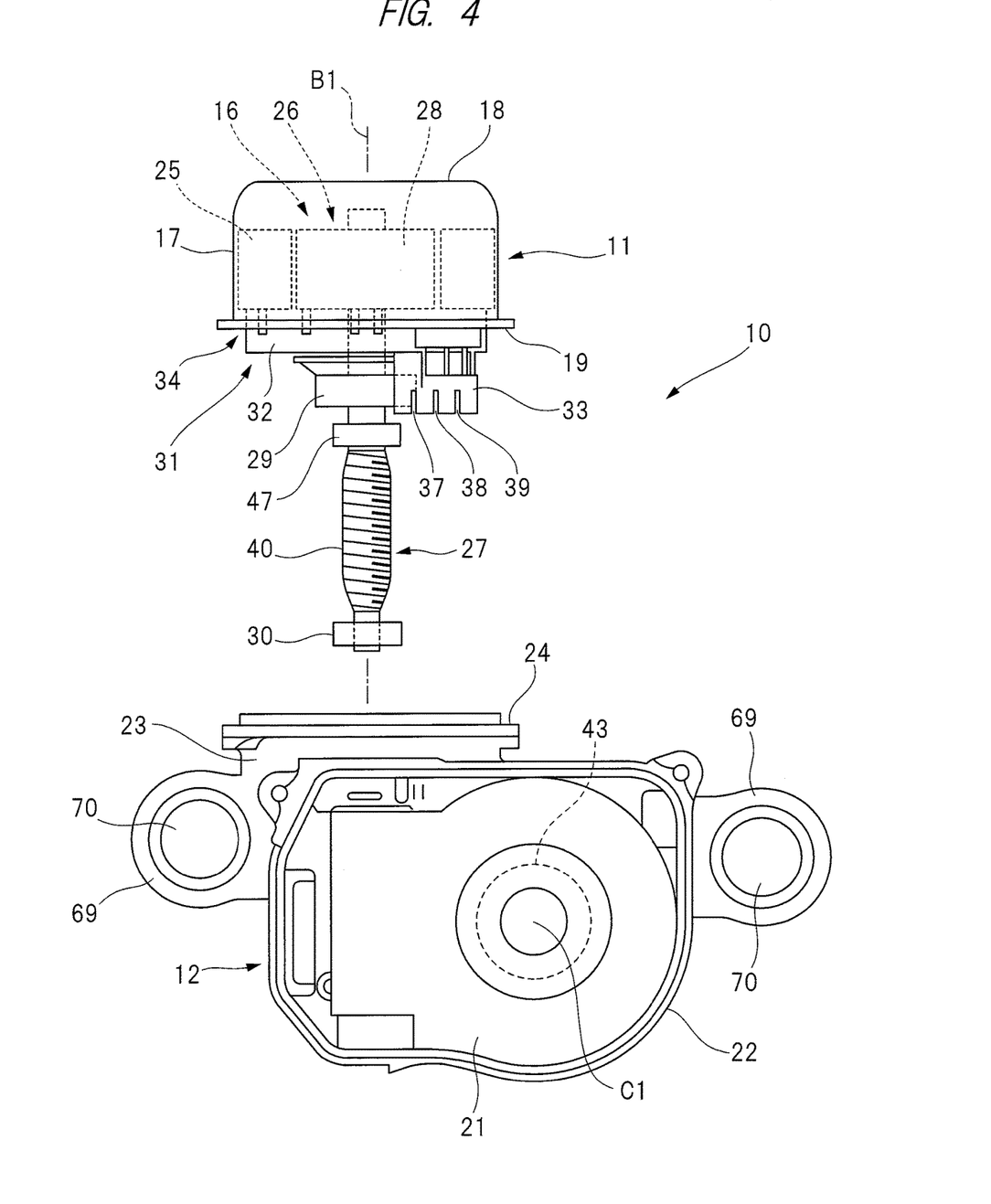
FIG. 4 is a bottom view showing an assembling process of the driving apparatus shown in FIG. 1.

Hereinafter, an assembling process of the driving apparatus 10 will be described. As shown in FIG. 4, a worker first positions the electric motor 16 and the motor case 11 relative to each other, and translates the motor case 11 closer to the gear case 12. As a result, the rotating shaft 27 is inserted into the shaft hole 20 as the projecting portion 33 of the terminal holder 31 is put through the through-hole 36 to reach the side of the connecting portion 23. The cylindrical portion 32 of the terminal holder 31 is fitted in the recessed portion 35, which stops the terminal holder 31 from moving further relative to the gear case 12.

Here, FIG. 4 shows a mounting process of a unit having the motor case 11, electric motor 16, and terminal holder 31 combined together to the gear case 12. However, another process may be adopted, and in another process, the electric motor 16 and the terminal holder 31 may be separately mounted to the gear case 1, and the motor case 12 may be mounted to the gear case 12. Subsequently, by tightening the screw 14, the motor case 11 and the gear case 12 are fixed to each other.

Following the above step, the worker places the worm wheel 41 in the recessed portion 21 of the gear case 12, and engages the worm gear 42 with the worm 40. The worker then brings the cover 13, which is fitted with the board cover 48 and the control board 49, and the gear case 12 closer to each other in the direction along the axis C1. Here, this step causes the leg portion 58b of the terminal 58 to enter the terminal holding slot 37, and the leg portion 58b is connected to the terminal 44. After the leg portion 58b of the terminal 58 is connected to the terminal 44, the leg portion 59b of the terminal 59 enters the terminal holding slot 38, and the leg portion 59b is connected to the terminal 45. Then, after setting the cover 13 and the gear case 12 in contact with each other, the worker tightens the screws 15 to fix the cover 13 and gear case 12 together, thus finishing assembling the driving apparatus 10.

When the driving apparatus 10 is assembled, the three terminals 44, 45, and 46 are arranged at intervals on substantially the same circumference around the axis B1 of the rotating shaft 27. This prevents an increase in size of the driving apparatus 10 in the direction along the axis C1 or the direction along the virtual line D1.

Furthermore, during the process of assembling the driving apparatus 10, when the worker brings the cover 13 and the gear case 12 closer to each other, and respectively connects the terminals 58, 59, and 60 to the terminals 44, 45, and 46 through their sliding movements, the projecting portion 33 is subjected to a pressure load or press-fitting load. The projecting portion 33 is of the arcuate shape along the circumference around the axis B1, and has a thickness in a direction along the axis C1 made larger. In other words, the projecting portion 33 has the larger thickness and higher rigidity in the direction in which it is subjected to the press-fitting load.

Furthermore, the terminals 44, 45, and 46 are respectively disposed at positions which differ from each other in the direction along the axis C1. As a result, even if the distances or intervals between the terminals 44, 45, and 46 are reduced in the direction along the axis B1, the terminals 44, 45, and 46 are kept insulated from each other.

Furthermore, since the terminals 44, 45, and 46 are disposed at respective positions in the direction along the axis C1, the terminal 44, 45, and 46 are respectively connected to the terminals 58, 59, and 60 at different points of time. The projecting portion 33 is, therefore, not subjected to three press-fitting loads at once. This suppresses a decline in durability of the projecting portion 33.

Furthermore, the press-fitting load applied to the projecting portion 33 is transmitted through the inner wall 36a forming the through-hole 36 and is received by the connecting portion 23. This suppresses a decline in durability of the terminal holder 31. In a bottom view of the driving apparatus 10, the terminals 58, 59, and 60 are disposed outside the edge 49a of the control board 49. As a result, in the process of bringing the cover 13 and the gear case 12 closer to each other in the direction along the axis C1 to respectively connect the terminals 58, 59, and 60 to the terminals 44, 45, and 46, the worker is able to prevent the terminals 58, 59, and 60 from interfering with other components housed in the housing chamber A1.

Furthermore, in a plan view, the terminals 58, 59, and 60 are symmetrical with respect to their respective connecting portions 58c, 59c, and 60c. Because of their symmetrical shape, the terminals 58, 59, and 60 may be mounted to the control board 49 in their 180-degree reverted position in a plan view at the step of mounting the terminals 58, 59, and 60 to the control board 49. In such a case, the leg portions 58b, 59b, and 60b are attached to the control board 49, and the leg portions 58a, 59a, and 60a are disposed outside the edge 49a of the control board 49.

In this case, when the cover 13 and the gear case 12 are brought closer to each other in the process of assembling the driving apparatus 10, the leg portion 58a, the leg portion 59a, and the leg portion 60a are respectively connected to the terminal 44, the terminal 45, and the terminal 46. The terminals 58, 59, and 60 are the same in shape and structure as each other. The terminals 58, 59, and 60 are, therefore, do not need to be provided as components different from each other, and are therefore provided as common components. The terminals 58, 59, and 60 do not need to have any specific positional relation between them to be mounted on the control board 49. It is possible to improve assembling work efficiency and to eliminate improper assembling.

Furthermore, in FIG. 5 which is a bottom view of the driving apparatus 10, a part of an area occupied by the worm wheel 41 and a part of an area occupied by the projecting portion 33 overlap each other. In the bottom view of the driving apparatus 10, therefore, an increase in size of the driving apparatus 10 in the direction along the axis B1 is suppressed.

Hereinafter, a correspondence relationship between elements described in this embodiment and elements of the claimed driving apparatus will be described. The terminals 58, 59, and 60 correspond to "first terminals" of the claimed driving apparatus, and terminals 44, 45, and 46 correspond to "second terminals" of the claimed driving apparatus. The motor case 11 and the gear case 12 correspond to a "casing" of the claimed driving apparatus. The inner wall 36a corresponds to a "load receiving portion" of the claimed driving apparatus.

According to another embodiment of the driving apparatus, by fitting the cover to the casing, the first terminals are respectively connected to the first terminals.

According to another embodiment of the driving apparatus, it is possible to prevent the driving apparatus from being increased along an axis line of the rotating shaft of the driving apparatus.

According to another embodiment of the driving apparatus, when the first terminal is connected to the second terminal, the casing can receive a load applied to the second terminal, thereby increasing the durability of the projecting portion.

The driving apparatus is not limited to the above embodiment and may obviously be modified into various forms on the condition that the modification does not deviate from the substance of the invention. For example, the terminal holding slots 37, 38, and 39 respectively holding the terminals 44, 45, and 46 may be formed as cutouts or insertion recessions. In other words, the terminal holder of the driving apparatus may have an insertion portion which holds second terminals and in which first terminals can be inserted. The insertion portion may include terminal holding slots 37, 38, and 39, cutouts (not shown), and insertion recessions (not shown). The number of the first terminals and the number of the second terminals is not limited to 3 but may be 2 or 4 or more. The structure in which the second terminals are supported by the projecting portion may include a structure in which the second terminals are fixed to the projecting portion and a structure in which the second terminals can be attached to and detached from the projecting portion.

The electric motor of the driving apparatus may include a brushless motor and a motor with brushes. The motor with brushes has a commutator fixed to the rotating shaft, a brush holder fitted to the motor case, and brushes supported by the brush holder and in contact with the commutator. The brush holder carries the second terminals, which are connected to the brushes.

The driving apparatus can be used as, for example, a power supply unit of a motion device incorporated in a vehicle. The motion device includes a wiper, a power window, and a power slide door.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A driving apparatus having an electric motor configured to rotate a rotating shaft by a supplied current, the driving apparatus comprising:
   a control board which is positioned relative to the electric motor, and on which electronic components for controlling the electric motor is mounted;
   a casing in which the electric motor is housed;
   a cover fitted to the casing, the cover supporting the control board;
   a worm formed on an outer periphery of the rotating shaft;
   a worm wheel which is housed in the casing, the worm wheel having a worm gear which is engaged with the worm;
   a plurality of first terminals mounted on the control board, the first terminals carrying a current;

a plurality of second terminals which are connected to the respective first terminals, the second terminals carrying a current, the second terminals being disposed outside the rotating shaft in a radial direction of the rotating shaft, and arranged along a circumferential direction of the rotating shaft; and a terminal holder positioned to the casing, the terminal holder supporting the second terminals, an opening with which the casing is formed; and a projecting portion with which the terminal holder is formed, the projecting portion being disposed in the opening with the terminal holder positioned to the casing, wherein the second terminals is supported by the projecting portion, in a plan view perpendicular to an axis line of a rotation center of the worm wheel, an area occupied by the projecting portion and an area occupied by the worm wheel overlap each other.

2. The driving apparatus according to claim 1, wherein the casing has a load receiving portion which receives a force applied to the second terminals, with the first terminals and the second terminals connected to each other.

3. A driving apparatus having an electric motor configured to rotate a rotating shaft by a supplied current, the driving apparatus comprising:

a control board positioned relative to the electric motor, and mounted with electronic components for controlling the electric motor;

a casing in which the electric motor is housed;

a cover fitted to the casing, the cover supporting the control board;

a worm formed on an outer periphery of the rotating shaft;

a worm wheel housed in the casing, the worm wheel having a worm gear which is engaged with the worm;

a plurality of first terminals mounted on the control board, the first terminals carrying a current;

a plurality of second terminals which are electrically connected to the respective first terminals, the second terminals carrying a current, the second terminals being disposed outside the rotating shaft in a radial direction of the rotating shaft; and a terminal holder positioned to the casing, the terminal holder supporting the second terminals, wherein the casing has:

a first recessed portion opened toward the cover, the worm wheel being housed in the first recessed portion; and a second recessed portion opened toward the cover the electric motor, a through hole being formed between the first recessed portion and the second recessed portion, the terminal holder has:

a cylindrical portion disposed between the second recessed portion and the electric motor; and a projecting portion integrally provided to the cylindrical portion, the projecting portion projecting into the first recessed portion from the second recessed portion through the through hole, the projecting portion has terminal holding slots in which the first terminals and the second terminals are electrically connected to each other, respectively.

4. The driving apparatus according to claim 3, wherein in a plan view perpendicular to an axis line of a rotation center of the worm wheel, an area occupied by the projecting portion and an area occupied by the worm wheel overlap each other.

5. The driving apparatus according to claim 3, wherein the casing has a load receiving portion which receives a force applied to the second terminals, with the first terminals and the second terminals connected to each other.

* * * * *